(12) United States Patent
Kreutinger

(10) Patent No.: US 6,705,825 B2
(45) Date of Patent: Mar. 16, 2004

(54) LIFT GATE DEVICE

(75) Inventor: William E. Kreutinger, Williamsville, NY (US)

(73) Assignee: Ultron Lift Corp., Buffalo, NY (US)

( * ) Notice: Subject to any disclaimer, the term of this patent is extended or adjusted under 35 U.S.C. 154(b) by 107 days.

(21) Appl. No.: 10/196,696

(22) Filed: Jul. 15, 2002

(65) Prior Publication Data

US 2004/0009056 A1 Jan. 15, 2004

(51) Int. Cl.[7] .................................................. B60D 1/00
(52) U.S. Cl. ........................ 414/557; 414/917; 414/556; 414/554
(58) Field of Search ................................ 414/557, 917, 414/556, 554, 546, 558

(56) References Cited

U.S. PATENT DOCUMENTS

| | | | |
|---|---|---|---|
| 2,719,637 A | 10/1955 | Wood | |
| 3,138,270 A | 6/1964 | McCarty | |
| 3,258,140 A | 6/1966 | Appleman | |
| 3,369,678 A | 2/1968 | Robinson | |
| 3,498,481 A | 3/1970 | Size | |
| 3,528,573 A | 9/1970 | Denner | |
| 3,528,574 A | 9/1970 | Denner et al. | |
| 3,666,121 A | 5/1972 | Denner et al. | |
| 3,737,055 A | 6/1973 | Pettit | |
| 4,078,676 A | 3/1978 | Mortenson | |
| 4,147,261 A | * 4/1979 | Dautel et al. ............... | 414/557 |
| 4,395,187 A | 7/1983 | Corley, Jr. | |
| 4,405,279 A | 9/1983 | Davy et al. | |
| 4,505,359 A | 3/1985 | Corley, Jr. | |
| 4,729,712 A | * 3/1988 | Corley, Jr. ................... | 414/557 |
| 4,813,842 A | * 3/1989 | Morton ........................ | 414/557 |
| 4,836,736 A | 6/1989 | Neagu | |
| 4,930,969 A | 6/1990 | Langer | |
| 4,930,973 A | 6/1990 | Robinson | |
| 5,118,246 A | 6/1992 | Saussard et al. | |
| 5,641,262 A | * 6/1997 | Dunlop et al. ............... | 414/557 |
| 6,102,646 A | * 8/2000 | Bass et al. ................... | 414/537 |

* cited by examiner

Primary Examiner—Christopher P. Ellis
Assistant Examiner—Rashmi Sharma
(74) Attorney, Agent, or Firm—Hodgson Russ LLP

(57) ABSTRACT

A lift gate used for vehicles such as a truck. The lift gate has a platform which is pivotally mounted to what constitutes a vertical link at the rear end of a parallelogram linkage. In the stored position, the platform is folded to overlie the parallelogram linkage. The bottom of the platform is provided with a pair of surfaces that provide the appearance of a bumper when the lift gate is in the stored position.

22 Claims, 11 Drawing Sheets

LIFT GATE DEVICE

FIELD OF INVENTION

The present invention relates generally to lift gates for vehicles such as trucks, and specifically to a lift gate that folds when it is stored such that it provides a bumper at the rear of the vehicle.

BACKGROUND OF THE INVENTION

Lift gates are generally known in which a parallelogram linkage connected between a portion of the chassis at the rear of a truck and a platform is adapted to raise and lower the platform in such a way that the platform remains horizontal or substantially horizontal during the raising and lowering. The raising and lowering is typically accomplished hydraulically, with a hydraulic cylinder being connected in such a way that it can be used to rotate one of the links of the parallelogram, thus causing the rear portion of the parallelogram linkage to move either up or down. In a typical installation, the power is applied in order to raise the platform, and gravity is used to lower the platform.

The platforms of lift gates are typically stored either in a vertical position, in which they rest up against the back doors of the truck, or in a stored position under the rear chassis of the truck.

Typically the platform is pivotally mounted to what constitutes a vertical link at the rear end of the parallelogram linkage. The platform is ordinarily constructed in such a way that it can, while extending rearwardly from the parallelogram linkage, only pivot downwardly to a given predetermined position, typically one in which it is approximately parallel with the ground (horizontal). Further pivoting of the frame is prevented by mechanical interference between a flange or bracket and the rearward vertical link of the parallelogram linkage. To place the platform in a stored position, the platform is swung upward, through the vertical dead center position, and then inwardly and downwardly to overlie the parallelogram linkage itself.

In the typical stored position, the folded platform and linkage is visible from the rear of the truck. What is needed is a lift gate that folds up for storage into a configuration that provides a bumper such that the appearance of the rear of the vehicle is improved and that provides rear end impact protection.

SUMMARY OF THE INVENTION

The present invention meets the above-described need by providing a lift gate that folds into a storage configuration that provides a bumper at the rear of the vehicle.

BRIEF DESCRIPTION OF THE DRAWINGS

The invention is illustrated in the drawings in which like reference characters designate the same or similar parts throughout the figures of which.

DETAILED DESCRIPTION

Figure 1:
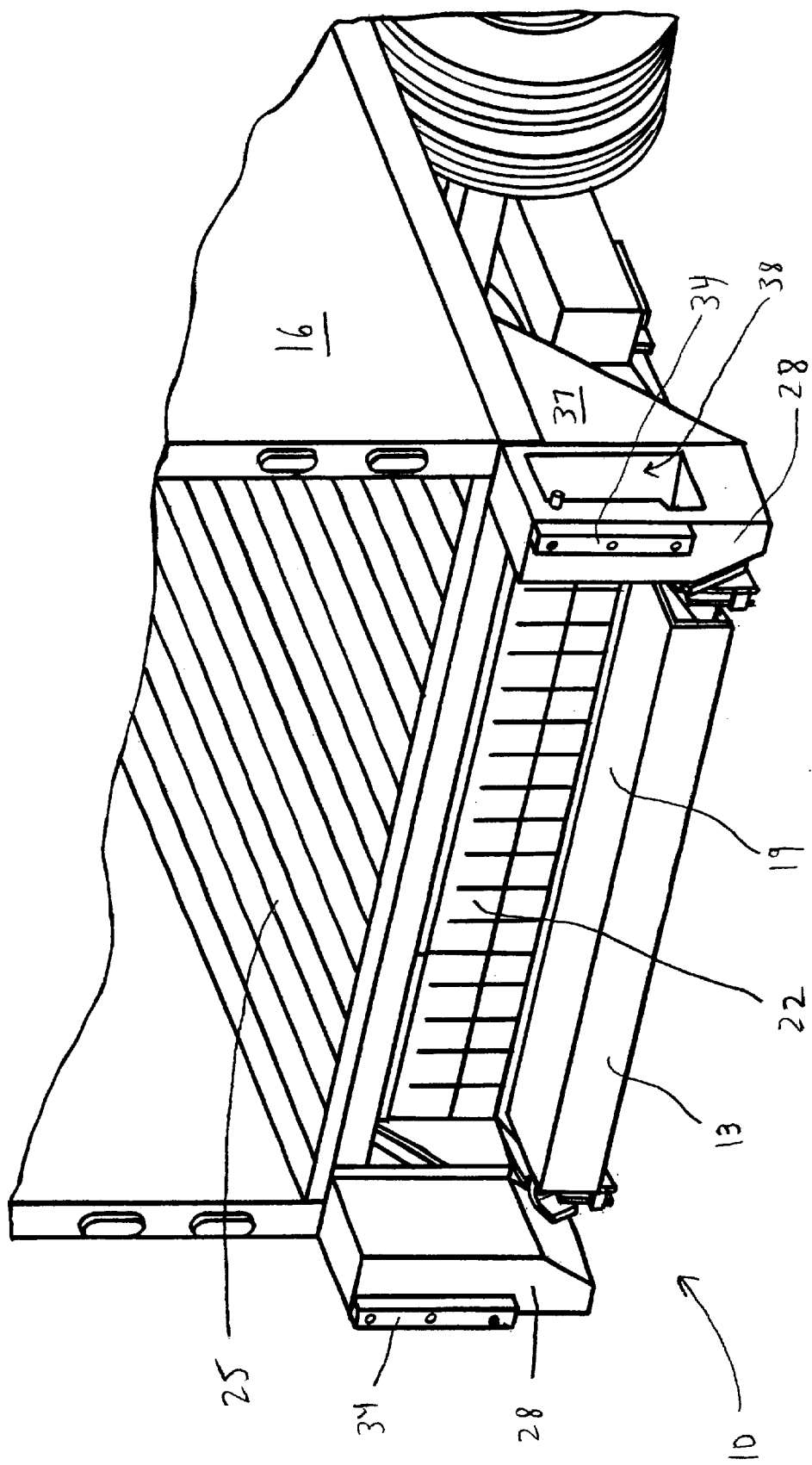
FIG. 1 is a perspective view of the rear of a truck with the lift gate of the present invention in the stored position.

In FIG. 1, the lift gate 10 of the present invention is shown in its stored position. As shown, the lift gate 10 provides a bumper when it is in the stored position. A substantially planar surface 13 is shown in a vertical orientation with respect to a truck 16. A substantially planar surface 19 is shown in a horizontal orientation with the respect to the orientation of FIG. 1. The planar surfaces 13 and 19 will be described in greater detail hereafter. A planar member 22 is disposed vertically with respect to the truck 16. The planar member 22 is cosmetic and is not load bearing and is attached to the underside of the truck 16. The planar member 22 in conjunction with the planar surfaces 13 and 19 provide the elements that provide the appearance of a standard bumper at the rear of the truck 16. The bumper provided by these elements is more aesthetically pleasing than a standard lift gate arrangement underneath the rear chassis of the truck 16 and provides rear impact protection.

The truck 16 is shown with the rear door open so that the floor 25 is visible. On each side of the rear of the truck 16, there are structural members 28 that provide the actual bumper for the truck 16 and that include rubber-like strips 34 that provide cushioning for the impact when the members 28 strike an object.

A triangular gusset 37 provides additional support for structural members 28. The side of the structural members 28 may include an opening 38 for the controls for the automatic lift gate 10 of the present invention as will be described herein.

Figure 2:
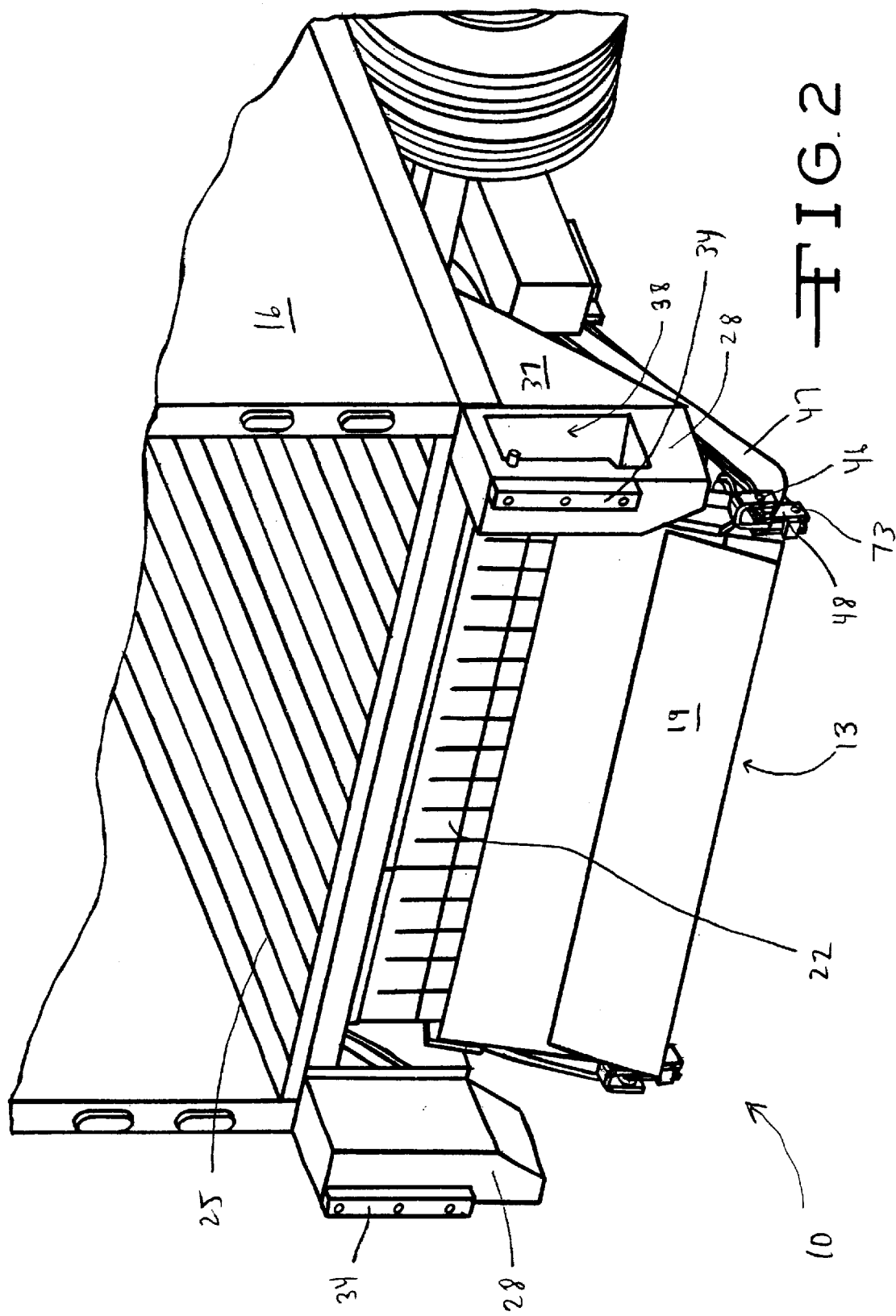
FIG. 2 is a perspective view of the lift gate of FIG. 1 in an intermediate position where the lift gate has been partially lowered.

Turning to FIG. 2, the lift gate 10 is partially lowered by gravity such that the bumper is tilted downward. The bumper is formed out of two surfaces 13 and 19 on the bottom of a platform 40. The platform 40 is pivotally attached to the upper arm 47 of a parallelogram linkage. The platform 40 pivots about pivot point 46 where the upper arm 47 connects to the platform 40 and a vertical link 48. The platform 40 is capable of pivoting about pivot 46 from a first position where it overlies the parallelogram linkage to a second position where it extends rearwardly from the parallelogram linkage. The platform 40 is typically restricted such that it can only pivot downwardly to a given predetermined position, typically one in which it is approximately parallel with the ground (horizontal). Further pivoting of the platform 40 is typically prevented by mechanical interference between a flange or bracket and the rearward vertical link 48 of the parallelogram linkage.

With regard to the orientation of FIG. 2, the lower end of vertical link 48 is pivotally attached to a lower arm 50 (best shown in FIGS. 6 and 8) at pivot point 73.

Figure 3:
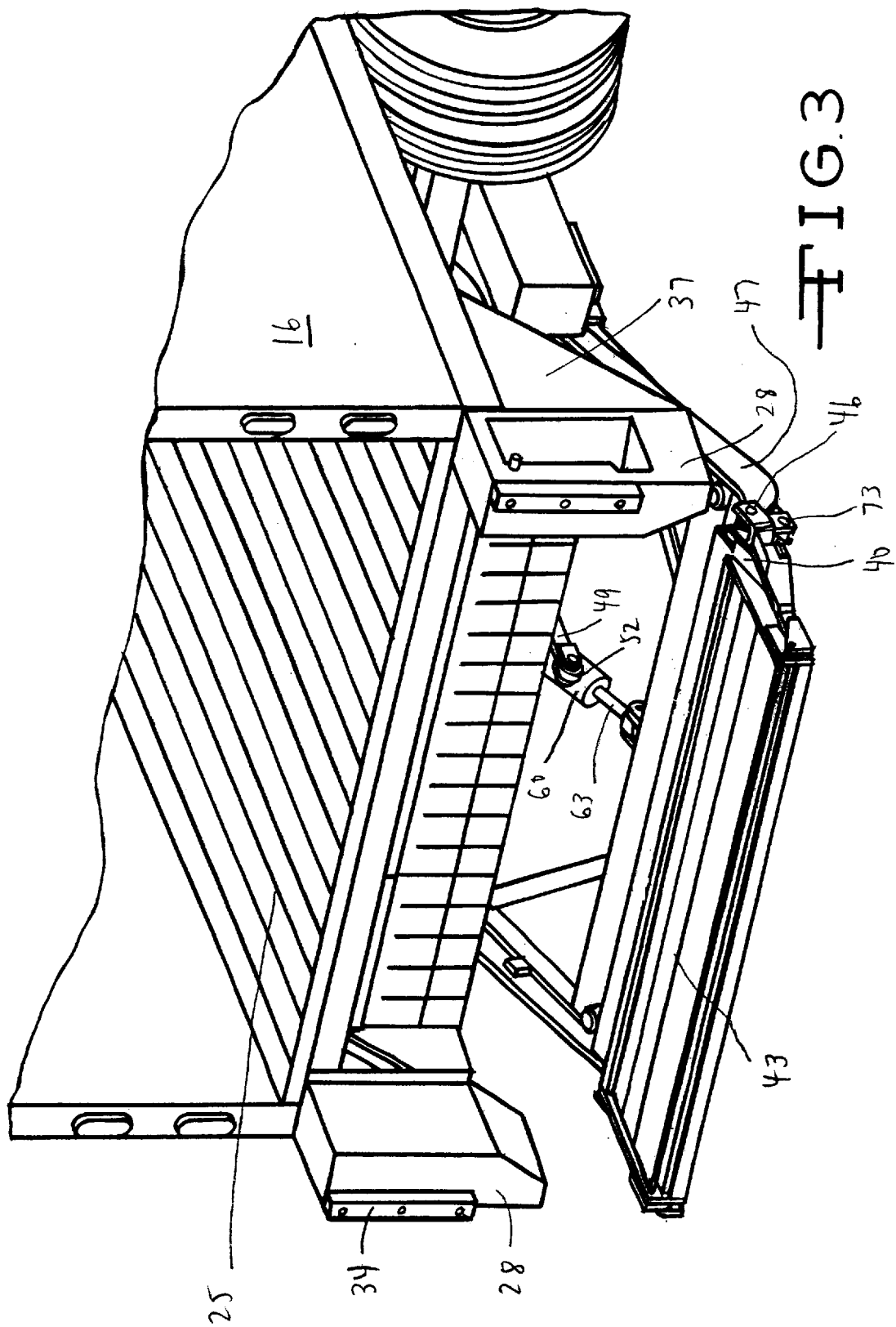
FIG. 3 is a perspective view of the lift gate of FIG. 1 in an intermediate position where the lift gate has been partially lowered and the platform and flip over ramp have been rotated outward.
Figure 9:
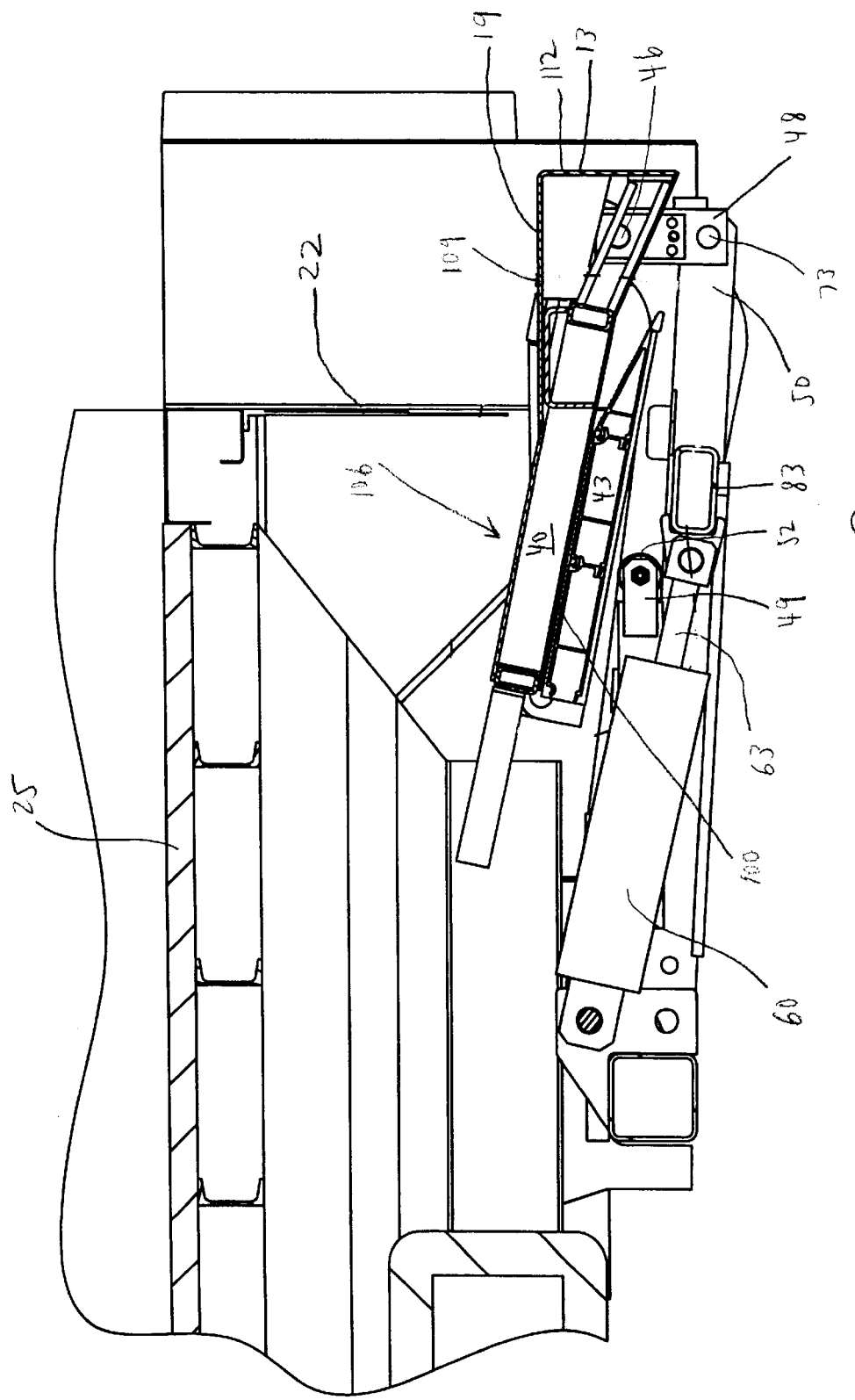
FIG. 9 is a cutaway side view of the lift gate of FIG. 1 in the stored position such that it provides a bumper.

In FIG. 3, the platform 40 and flip over ramp 43 are rotated rearward about pivot point 46, from the position shown in FIG. 2, in a direction away from the end of the truck 16 such that the linkage is now exposed. The rotation of the platform 40 and flip over ramp 43 is accomplished manually by grasping the top end of the platform 40 shown in FIG. 2 and pulling forward. An extension 49 having a wheel 52 disposed at the end makes it easier to rotate the platform 40 into the position shown in FIG. 3. As the platform 40 is being lowered, the platform 40 and flip over ramp 43 are rotated forward through engagement with the wheel 52. As best shown in FIG. 9, when the lift gate 10 is in the stored position of FIG. 1, the flip over ramp 43 abuts with the wheel 52 such that rotation of the linkage downward causes the platform 40 and flip over ramp 43 to rotate about pivot 46 by action of the extension 49 and wheel 52. The platform 40 and flip over ramp 43 are thereby rotated rearward toward the dead center position with regard to pivot 46. Accordingly, by operation of wheel 52 the platform 40 is automatically rotated toward the dead center position. As a result it requires less effort to manually rotate the platform 40 and flip over ramp 43 rearward through the dead center position to the. point where gravity will assist in rotating the elements to the position shown in FIG. 3.

As shown in FIG. 3, the lift gate 10 is hydraulically operated by means of a cylinder 60 having a piston 63 connected to horizontal bar 83 (FIGS. 7 and 8) which is connected to lower arm 50 as will be described in greater detail herein. The lift gate 10 is raised by the operation of the hydraulic cylinder and lowered by gravity.

Figure 4:
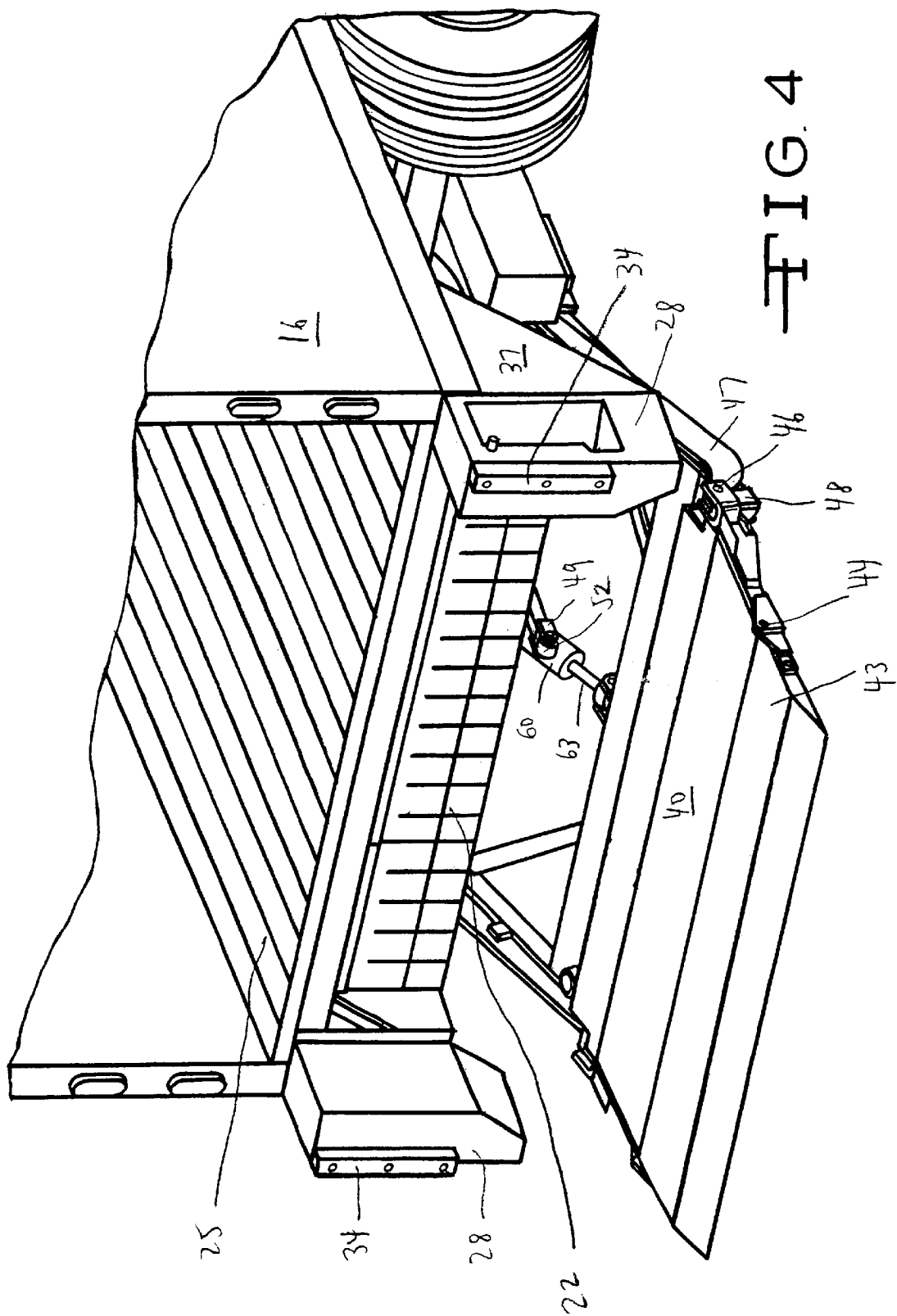
FIG. 4 is a perspective view of the lift gate of FIG. 1 where the platform and flip over ramp have been fully deployed to provide a substantially horizontal support surface.
Figure 5:
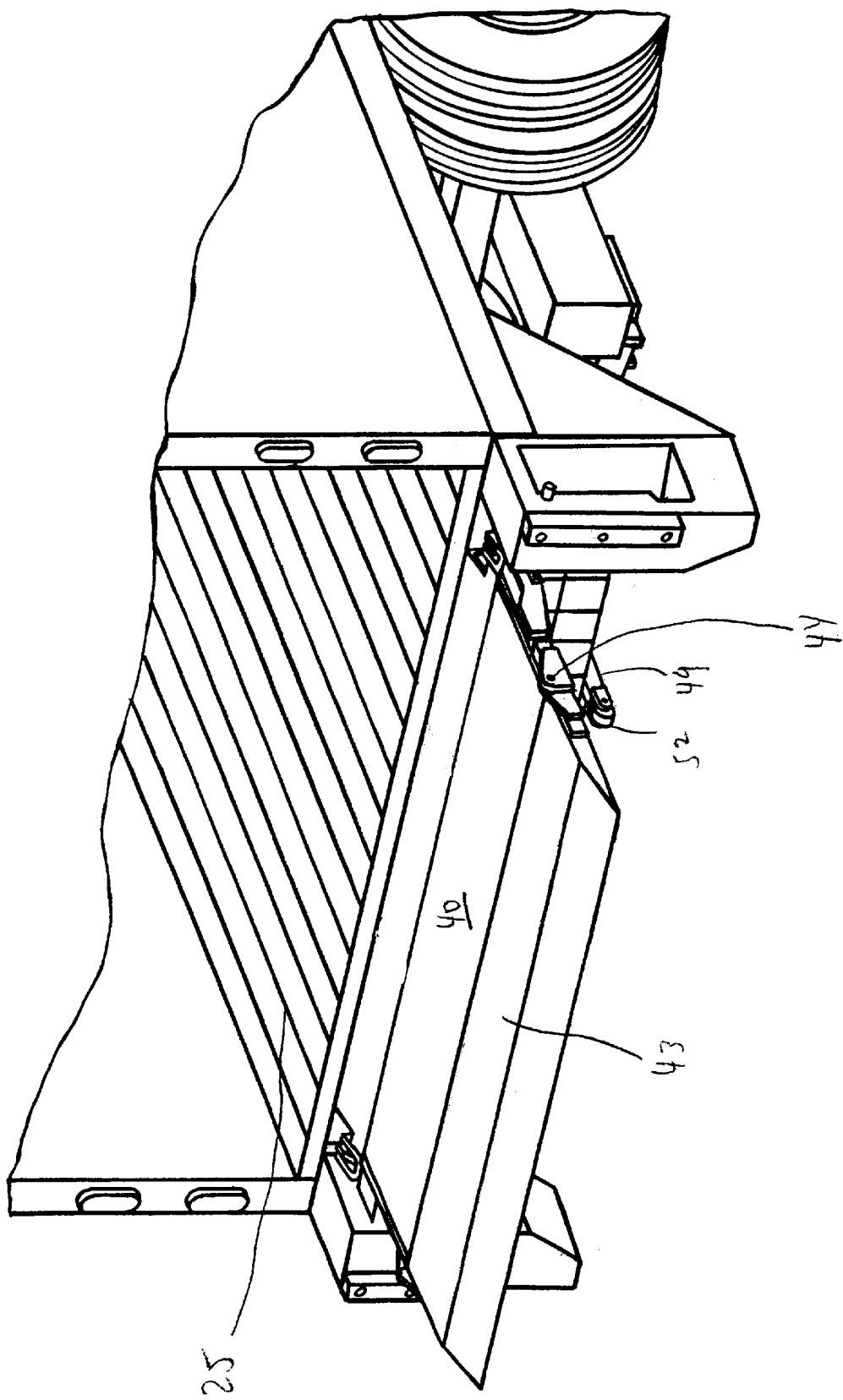
FIG. 5 is perspective view of the horizontal support surface elevated by the hydraulic system to a position where the platform is the same height as the floor of the truck.

In FIG. 4, the flip over ramp 43 has been rotated about its pivot point 44 such that the platform 40 and flip over ramp 43 form a planar support surface that is substantially horizontal with the ground. By operation of the hydraulic cylinder 60, the planar support surface can be raised from the position shown in FIG. 4 to the position shown in FIG. 5 where the support surface 46 is at the same height as the floor 25 of the truck 16. As known to those of ordinary skill in the art, the parallelogram linkage enables the support surface to remain substantially horizontal while it moves from the position shown in FIG. 4 to the position shown in FIG. 5.

Figure 6:
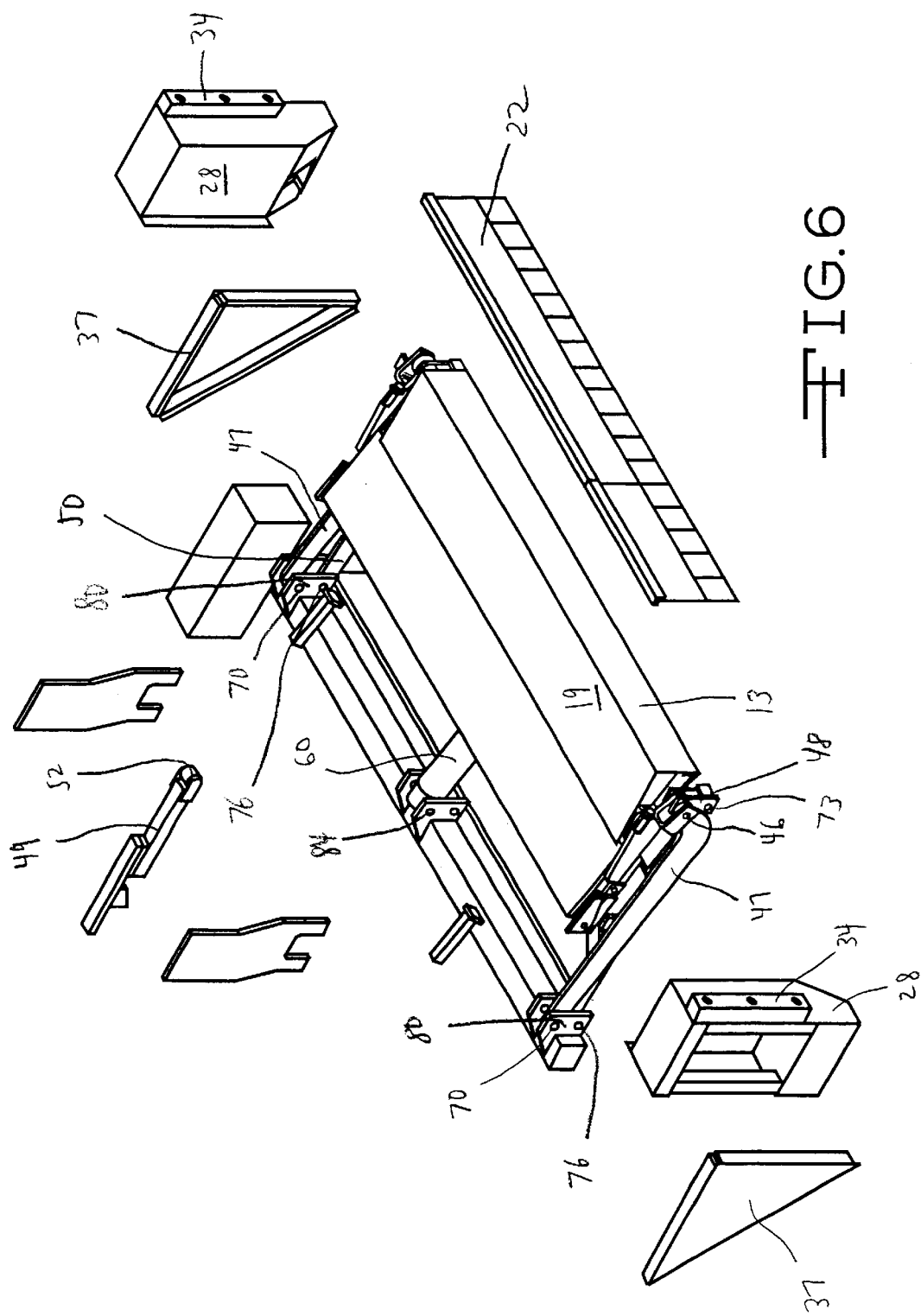
FIG. 6 is an exploded view of the lift gate of FIG. 1.

In FIG. 6, the components of the lift gate 10 are shown in an exploded view. On opposite sides of the lift gate 10, structural members 28 and triangular gussets 37 are shown. The triangular gussets 37 are typically formed out of steel and provide additional support for the structural members. The platform 40 and flip over ramp 43 are shown in the position where they are folded to overlie the parallelogram linkage. Referring to the left hand side of the figure, the upper arm 47 of the linkage extends from a fixed pivot point 70 at a first end where it is attached to the chassis of the truck 16 to pivot point 46 where it is attached to vertical link 48. The lower arm 50 is attached at one end to the vertical link 48 at a pivot point 73. Referring to the right hand side of the figure, the lower arm 50 is attached at the opposite end to a fixed pivot point 76 on a mount tube. The structural member 80 containing fixed pivot points 70 and 76 provides the fixed link of the parallelogram linkage. Upper arm 47 and vertical link 48 both move in response to the rotation of the lower arm 50 by means of the hydraulic cylinder 60. The hydraulic cylinder 60 is disposed in the center of the linkage and the piston 63 connects to the lower arm 50 (best shown in FIG. 7) through a cross member 83. At the opposite end, the hydraulic cylinder 60 pivotally attaches to the chassis of the truck at pivot point 84. The planar member 22 also attaches underneath the truck 16 and extends vertically as shown in FIG. 1.

Figure 7:
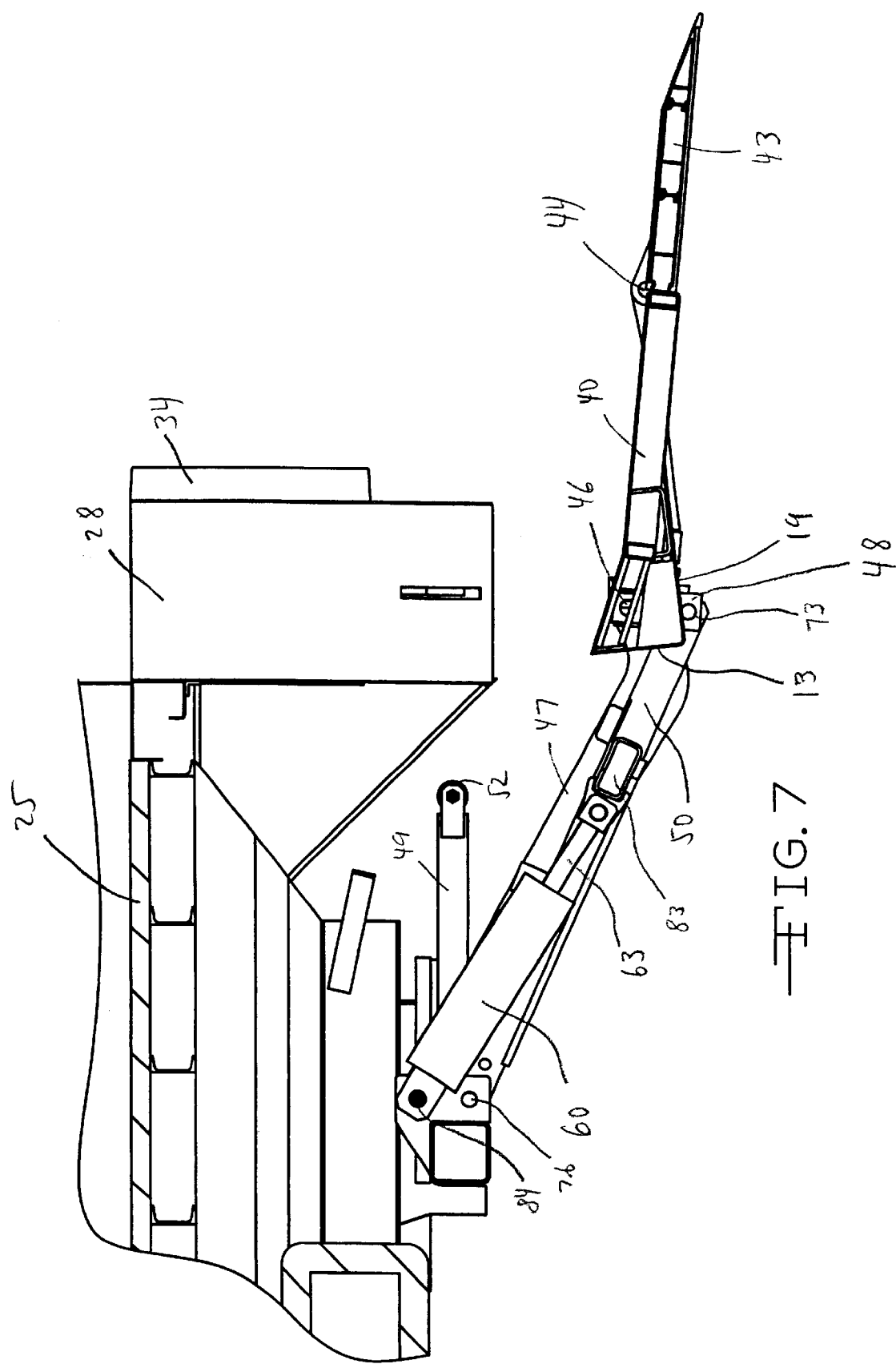
FIG. 7 is a cutaway side view of the lift gate of FIG. 1 with the platform and flip over ramp deployed.

As shown in FIG. 7, the piston 63 of the hydraulic cylinder 60 connects at one end to a cross member 83 extending between the lower arms 50 on each side of the lift gate 10. The stroke of the piston 63 causes lower arm 50 to rotate about its pivot point 76 on the chassis. Accordingly, the lower arm 50 can be rotated upward-under-power of the hydraulic cylinder 60 as known to those of ordinary skill in the art. In order to rotate the lower arm 50 downward toward the ground, the hydraulic pressure can be released and the arm 50 will rotate under the force of gravity.

Figure 8:
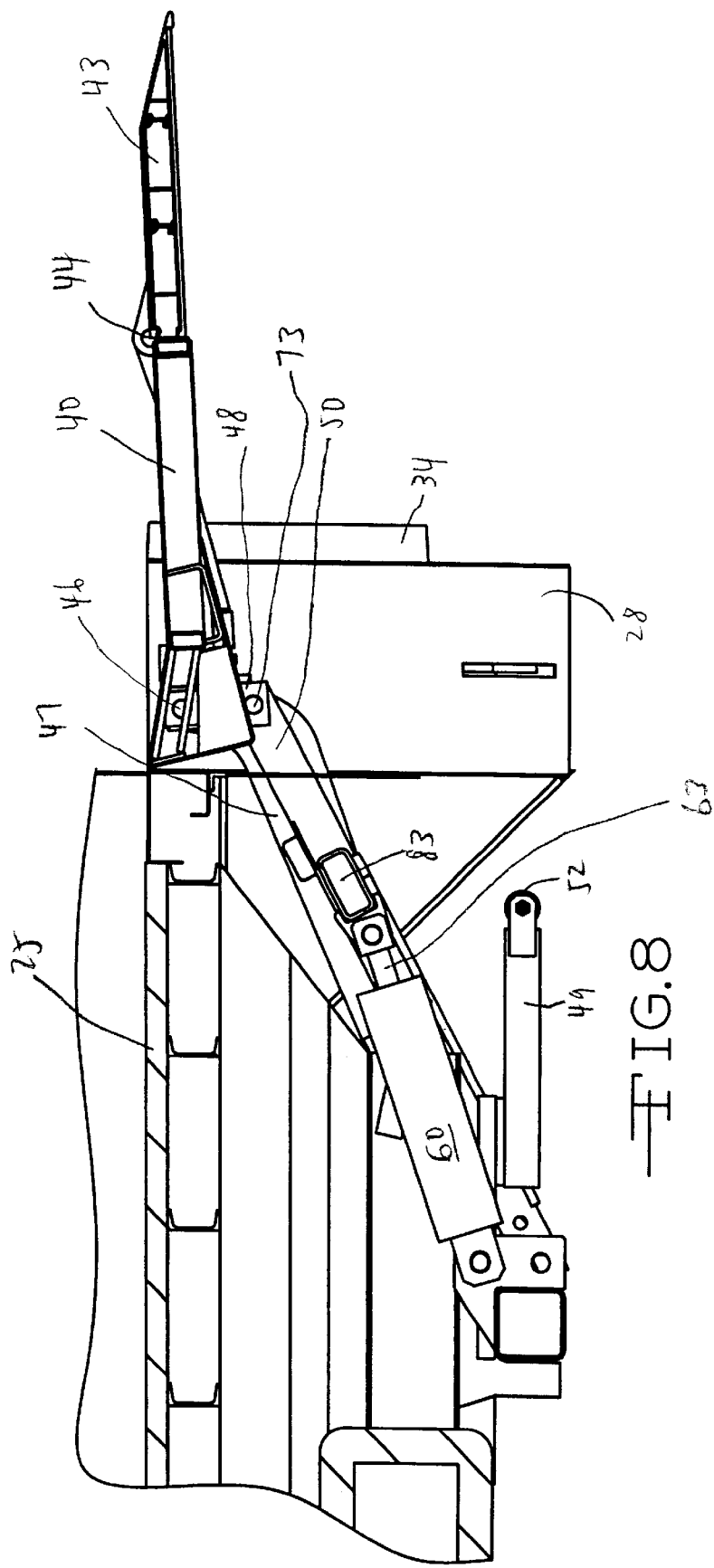
FIG. 8 is a cutaway side view of the lift gate of FIG. 1 with the platform in its fully elevated position such that it is at the same height as the floor of the truck.

Turning to FIG. 8, if the lower arm 50 is rotated upward far enough the platform 40 will eventually be disposed substantially at the same height as the floor 25 of the truck 16.

In FIG. 9, a cutaway side view of the device illustrates the position of the platform 40 and flip over ramp 43 when the device 10 is in its stored position. Returning to FIG. 7, in order to change from the fully deployed condition shown in FIG. 7 to the stored condition shown in FIG. 9, first the flip over ramp 43 is rotated about its pivot point 44 such that it overlies the platform 40 as shown in FIG. 3. Next, the hydraulic cylinder 60 is activated such that the lower arm 50 is rotated upward. Once the arm 50 has been rotated to a certain point, the platform 40 and flip over ramp 43 can be manually rotated about pivot point 46 through the dead center position to the position shown in FIG. 2. From the position shown in FIG. 2, additional rotation of the lower arm 50 by means of the hydraulic cylinder 60 will bring the device 10 into the position shown in FIG. 1.

Returning to FIG. 9, surfaces 13 and 19 of the platform 40 are brought into the position shown in FIG. 1 such that the surfaces along with the vertical member 22 create the appearance of a bumper.

In the embodiment shown, the arm 47 attaches to the sides of the platform 40. It is contemplated that the upper arm 47 could be attached to the platform 40 at other positions such as toward the center of the platform 40. An opening can be provided anywhere along the length of the platform 40 for attachment of the upper arm 47 to the platform 40 at pivot point 46.

The platform 40 has a planar top surface 100 that is disposed substantially horizontally when the device is in the fully deployed position (FIG. 4). On the opposite side of the platform 40, a bottom surface 106 faces upward in the stored position shown in FIG. 9. The bottom surface has a section 109 that is angled with respect to the top surface 100. The angled section 109 extends substantially horizontally with respect to the ground when the lift gate is in the stored position. The angled section 109 includes surface 19. At the end of the angled section 109, an end portion 112 is disposed substantially perpendicular to the angled section 109. End portion 112 contains surface 13. As described above, when the lift gate is in its stored position shown in FIG. 9, the surfaces 19 and 13 form a bumper. Vertical planar surface 22 extends downward from the rear of the vehicle to a position adjacent to surface 19 to provide the appearance of a standard bumper at the rear of the vehicle.

Figure 10:
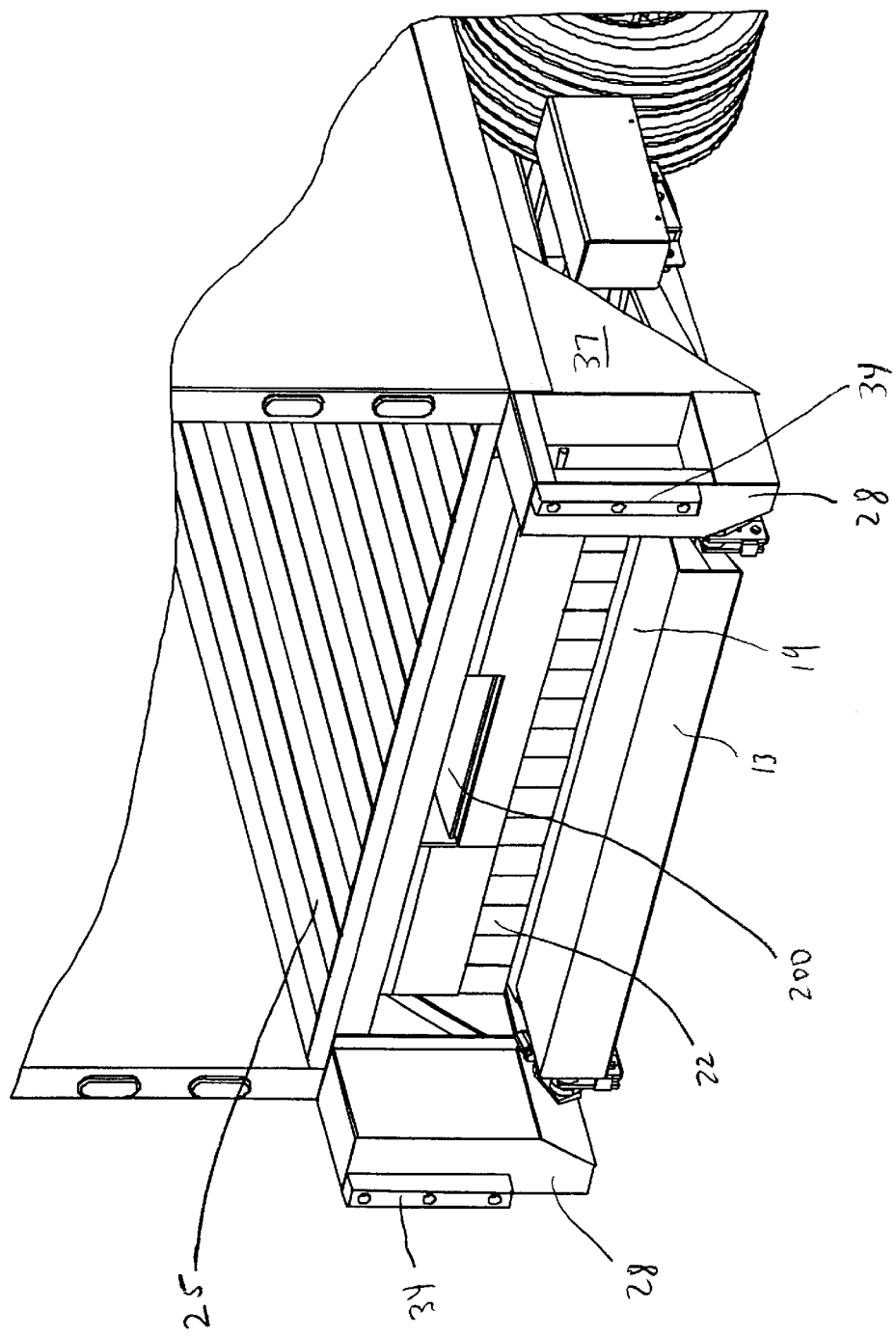
FIG. 10 is a perspective view of an alternate embodiment of the present invention including a pull-out ramp shown in the stored position; and, FIG. 11 is a perspective view of the embodiment shown in FIG. 10 with the pull-out ramp shown in its deployed position.
Figure 11:
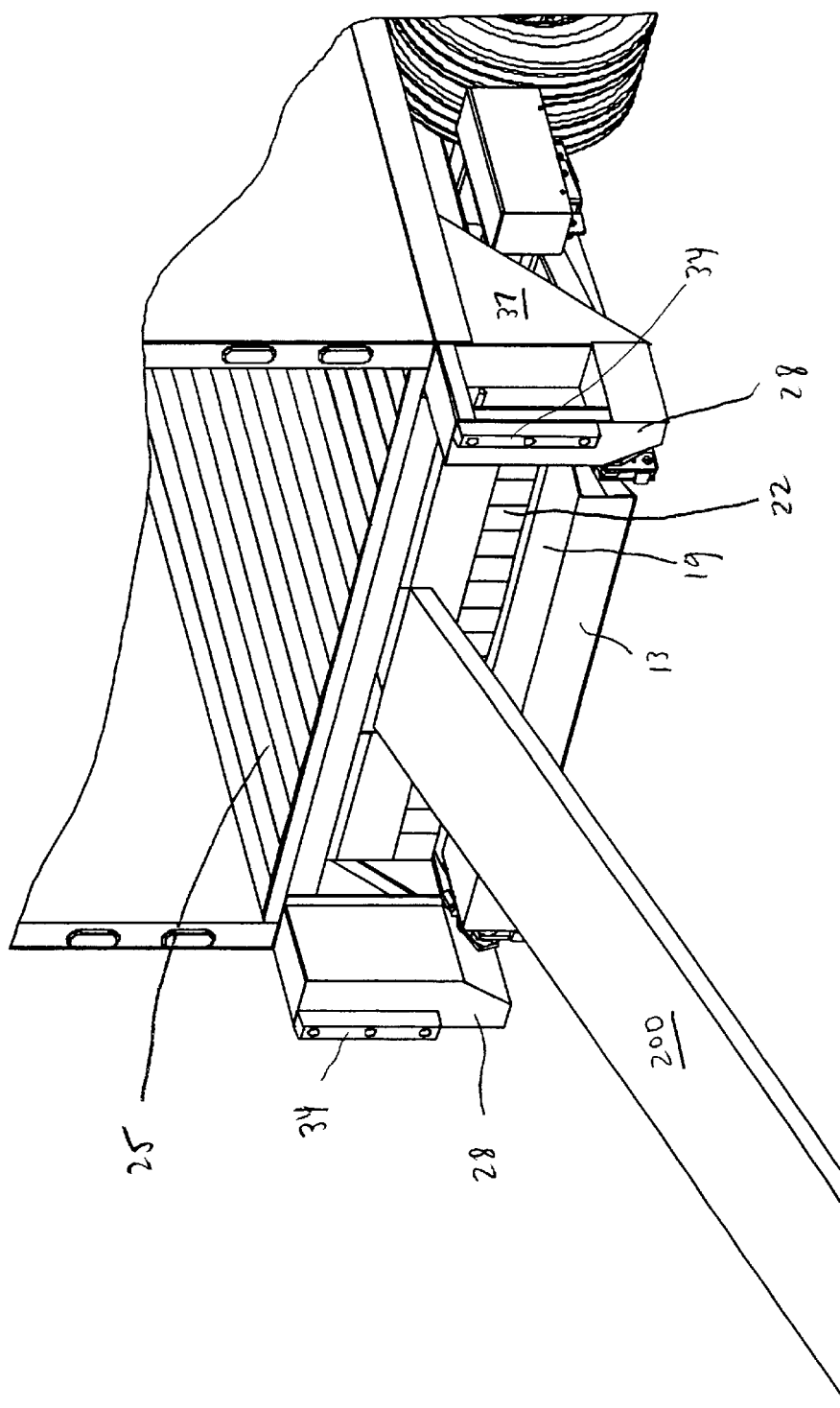

In FIGS. 10 and 11, the present invention is shown in connection with a pull-out ramp 200. The present invention provides for the use of both a lift gate 10 and a pull-out ramp 200. Because of the arrangement of lift gate 10, there is room to accommodate the pull-out ramp 200 in the standard manner. The pull-out ramp 200 attaches underneath the back of the truck in the standard manner as known to those of ordinary skill in the art. Also, the pull-out ramp 200 is capable of being extended into the deployed position shown in FIG. 11 in the usual manner known in the art and is capable of being retracted underneath the truck when the ramp 200 is not in use. Because of the position underneath the truck where standard lift gates are typically stored, a pull-out ramp and a standard lift gate are not usually combined. Accordingly, the combination of the lift gate 10 and pull-out ramp 200 forms another part of the invention.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A platform for use on a lift gate, the lift gate having a parallelogram linkage including a pair of upper arms and a pair of lower arms, the platform comprising:
   a top load carrying surface extending from a first end to a second end and having at least one planar portion for supporting a load;
   a bottom surface disposed opposite from the top surface, the bottom surface having an angled section forming a first surface, the angled section disposed at an angle with respect to the planar portion of the top surface;
   an end portion forming a second surface, the end portion disposed substantially perpendicular to the angled section;
   the platform being pivotally attached at the first end to the upper arm of the linkage such that the platform is capable of rotating between a first position where it overlies the parallelogram linkage and a second position where it extends rearwardly from the parallelogram linkage; and,
   wherein the first and second surfaces form an appearance of a bumper when the platform is rotated to a stored position where it overlies the linkage.

2. The platform of claim 1, further comprising a flip over ramp pivotally attached to the second end of the platform.

3. The platform of claim 1, wherein the end portion forming the second surface is disposed at the first end of the platform.

4. A lift gate for a vehicle, comprising:
   at least one upper arm having a first end and a second end, the first end of the upper arm being pivotally attached to the vehicle at a first pivot location;
   at least one lower arm having a first end and a second end, the first end of the lower arm being pivotally attached to the vehicle at a second pivot location, the second pivot location spaced below the first pivot location;
   a platform having a top side and a bottom side, the platform mounted for pivotal motion about the second end of the upper arm, the platform being capable of rotating between a stored position in which it overlies the upper arm and an extended position in which it projects rearwardly from the second end of the upper arm, the top side of the platform having a substantially planar portion, the bottom side of the platform having an angled section forming a first surface, the platform having an end portion disposed substantially perpendicular to the angled section to form a second surface, the first and second surfaces disposed such that when the platform is folded to overlie the upper arm the first and second surfaces form the shape of a bumper;
   a substantially vertical link connecting the second end of the upper arm to the second end of the lower arm thereby defining a parallelogram linkage;
   means for rotating the parallelogram linkage about the pivot locations on the vehicle; and,
   wherein the first and second surfaces on the bottom side of the platform form a bumper when the upper and lower arms are raised to a stored position.

5. The lift gate of claim 4, wherein the means for rotating the parallelogram linkage comprises a hydraulic cylinder having a piston attached to the lower arm such that movement of the piston causes the lower arm to rotate about its pivot location on the rear of the vehicle.

6. The lift gate of claim 4, further comprising a vertical planar surface extending downward from the rear of the vehicle and being disposed adjacent to the first surface of the bottom of the platform when the lift gate is in the stored position.

7. The lift gate of claim 4, wherein the upper arms are attached to the sides of the platform.

8. The lift gate of claim 4, wherein the upper arms are attached to the platform through openings that are laterally spaced from the sides of the platform.

9. The lift gate of claim 4, further comprising a flip over ramp pivotally attached to the platform.

10. The lift gate of claim 4, further comprising a pull-out ramp attached to the vehicle.

11. A lift gate for a vehicle comprising:
    a pair of upper arms having a first end and a second end, the first end of the upper arm being pivotally attached to the vehicle at a first pivot location;
    a pair of lower arms having a first end and a second end, the first end of the lower arms being pivotally attached to the vehicle at a second pivot location, the second pivot location spaced below the first pivot location;
    a link connecting between the second end of respective upper and lower arms thereby defining a parallelogram linkage;
    means for rotating the linkage about the pivot locations at the rear of the vehicle;
    a platform having a first end and a second end, the first end of the platform pivotally attached to the second end of the upper arms, the platform capable of pivoting from a first position where it overlies the upper arms of the linkage to a second position where it extends rearwardly from the upper arms at a position substantially horizontal with respect to the ground, the platform having a top load carrying surface extending from a first end to a second end and having at least one planar portion for supporting a load, the platform having a bottom surface disposed opposite from the top surface, the bottom surface having an angled section forming a first surface, the angled section disposed at an angle with respect to the planar portion of the top surface, the platform having an end portion forming a second surface, the end portion disposed substantially perpendicular to the angled section, wherein the first and second surfaces form the appearance of a bumper when the platform is rotated to overlie the linkage; and
    a downwardly extending vertical planar surface extending from the vehicle; and, wherein the first and second surfaces on the bottom side of the platform form a bumper adjacent to the vertical planar surface when the upper and lower arms are rotated upward to a position where the lift gate is in its stored position underneath the vehicle.

12. The lift gate of claim 11, wherein the means for rotating the parallelogram linkage comprises a cylinder having a reciprocating piston, the cylinder pivotally attached to the vehicle and attached to the parallelogram linkage.

13. The lift gate of claim 11, wherein the upper arms are attached to the sides of the platform.

14. The lift gate of claim 11, wherein the upper arms are attached to the platform through openings that are laterally spaced from the sides of the platform.

15. The lift gate of claim 11, further comprising a flip over ramp pivotally attached to the platform.

16. The lift gate of claim 11, further comprising a pull-out ramp attached to the vehicle.

17. A method of storing a lift gate on a vehicle, comprising:

providing at least one upper arm having a first end and a second end, the first end of the upper arm being pivotally attached to the vehicle at a first pivot location;

providing at least one lower arm having a first end and a second end, the first end of the lower arm being pivotally attached to the vehicle at a second pivot location, the second pivot location spaced below the first pivot location;

providing a platform having a top side and a bottom side, the platform mounted for pivotal motion about the second end of the upper arm, the platform being capable of rotating between a stored position in which it overlies the upper arm and an extended position in which it projects rearwardly from the second end of the upper arm, the top side of the platform having a substantially planar portion, the bottom side of the platform having an angled section forming a first surface, the platform having an end portion disposed substantially perpendicular to the angled section to form a second surface, the first and second surfaces disposed such that when the platform is folded to overlie the upper arm the first and second surfaces form the shape of a bumper;

providing a substantially vertical link connecting the second end of the upper arm to the second end of the lower arm thereby defining a parallelogram linkage;

providing means for rotating the parallelogram linkage about the pivot locations on the vehicle, wherein the first and second surfaces on the bottom side of the platform form a bumper when the upper and lower arms are raised to a stored position.

rotating the platform about its pivot point so that it overlies the linkage; and, rotating the linkage about its pivot point on the rear of the vehicle until the surfaces on the bottom side of the platform form a bumper at the rear of the vehicle.

18. The method of claim 17, wherein the means for rotating the parallelogram linkage comprises a hydraulic cylinder having a piston attached to the lower arm such that movement of the piston causes the lower arm to rotate about its pivot location on the rear of the vehicle.

19. The method of claim 17, further comprising a vertical planar surface extending downward from the rear of the vehicle and being disposed adjacent to the first surface of the bottom of the platform when the lift gate is in the stored position.

20. The method of claim 17, wherein the upper arms are attached to the sides of the platform.

21. The method of claim 17, wherein the upper arms are attached to the platform through openings that are laterally spaced from the sides of the platform.

22. The method of claim 17, further comprising a flip over ramp pivotally attached to the platform.

* * * * *